United States Patent [19]

Ritter

[11] Patent Number: 4,676,858
[45] Date of Patent: Jun. 30, 1987

[54] ORGANOBORON CONTAINING MIXTURES AND THEIR MANUFACTURE AND USE

[75] Inventor: Wolfgang Ritter, Düsseldorf, Fed. Rep. of Germany

[73] Assignee: Henkel Kommanditgesellschaft auf Aktien, Duesseldorf, Fed. Rep. of Germany

[21] Appl. No.: 748,691

[22] Filed: Jun. 25, 1985

Related U.S. Application Data

[63] Continuation of Ser. No. 412,517, Aug. 30, 1982, abandoned.

[30] Foreign Application Priority Data

Mar. 1, 1982 [DE] Fed. Rep. of Germany ....... 3207263

[51] Int. Cl.$^4$ .............................. C09J 5/02; C08F 4/12
[52] U.S. Cl. .................... 156/307.3; 156/332; 526/195; 526/196; 524/183; 524/404; 523/445
[58] Field of Search .............................. 526/195, 196; 156/307.3, 332; 524/404, 183; 523/445

[56] References Cited

U.S. PATENT DOCUMENTS

| | | | |
|---|---|---|---|
| 2,600,451 | 6/1952 | Van Horne et al. | 260/86.1 |
| 2,985,633 | 5/1961 | Welch | 260/85.3 |
| 3,055,945 | 9/1962 | Honeywitt, Jr. | 526/196 |
| 3,131,164 | 4/1964 | Doyle | 524/183 |
| 3,193,521 | 7/1965 | Jasching | 524/183 |
| 3,238,186 | 3/1966 | Schultz et al. | |
| 3,255,168 | 6/1966 | Borsini et al. | 260/89.1 |
| 3,380,980 | 4/1968 | Calkins et al. | 260/89.5 |
| 3,476,727 | 11/1969 | Lo Monaco et al. | 260/92.8 |
| 3,558,718 | 1/1971 | Gross | 526/195 |
| 3,633,490 | 1/1972 | Schiffmann et al. | 99/339 |
| 3,666,615 | 1/1970 | Iwai et al. | 161/185 |
| 3,829,973 | 8/1974 | Masuhara et al. | 32/15 |
| 4,153,769 | 5/1979 | Holm | 526/195 |
| 4,167,616 | 9/1979 | Bollinger | 526/197 |
| 4,243,462 | 1/1981 | Hori et al. | 156/310 |
| 4,285,755 | 8/1981 | Piestert et al. | 156/294 |
| 4,381,386 | 4/1983 | Ritter | 156/327 |
| 4,385,153 | 5/1983 | Ritter | 524/522 |

FOREIGN PATENT DOCUMENTS

| | | |
|---|---|---|
| 747192 | 11/1966 | Canada . |
| 2321215 | 11/1973 | Fed. Rep. of Germany . |
| 905394 | 9/1962 | United Kingdom ............... 524/404 |
| 1113722 | 5/1968 | United Kingdom . |
| 763428 | 9/1980 | U.S.S.R. ............................. 524/404 |

OTHER PUBLICATIONS

Abstract of Japanese Pat. No. 4,214,318, published by Derwent Publications Ltd.
Abstract of Japanese Pat. No. 4,529,195, published by Derwent Publications Ltd.

*Primary Examiner*—Joseph L. Schofer
*Assistant Examiner*—Peter F. Kulkosky
*Attorney, Agent, or Firm*—Ernest G. Szoke; Henry E. Millson, Jr.

[57] ABSTRACT

Organoboron containing starter systems having improved storage characteristics which are activated by air and which can be used to polymerize olefinic compounds, comprising a mixture of at least one organoboron compound which can be activated by air and at least one organic oligomer or polymer that is inert to the organoboron compound.

18 Claims, No Drawings

ORGANOBORON CONTAINING MIXTURES AND THEIR MANUFACTURE AND USE

This application is a continuation, of application Ser. No. 412,517, filed Aug. 30, 1982 now abandoned.

BACKGROUND OF THE INVENTION

It is known that organoboron compounds, particularly boron alkyl compounds, can be used to trigger free radical polymerizations at room temperature. The oxygen required for polymerization is always present and does not have to be added separately. Until now, the preferred compounds have been simple trialkyl boron compounds, such as triethyl boron or tri-n-butyl boron. The use of such trialkyl boron compounds as polymerization initiators is described, for instance, in U.S. Pat. Nos. 3,476,727; 3,633,490; 2,985,633; and G.B. Pat. No. 1,113,722. U.S. Pat. No. 4,167,616 describes the use of the reaction products of butadiene and diborane as polymerization initiators.

Such boron alkyl compounds are also useful as hardeners for monomeric adhesives, particularly for (meth)acrylate adhesives. These adhesive systems contain, in addition to acrylic acid esters or methacrylic acid esters, trialkyl boron compounds, for example triethyl boron, tri-n-butyl boron, and the like as their essential component; see for example Japanese Pat. No. 4,214,318.

Trialkyl boron compounds of this type, however, have the well known and crucial disadvantage of igniting easily or even igniting spontaneously, perhaps even at room temperature, so that the handling of these adhesive mixtures creates significant difficulties. Attempts have been made to overcome this disadvantage by reacting the trialkyl boron compounds with 0.3 to 0.9 moles of oxygen; see German Patent Application 23 21 215. Additionally, attempts have been made to react the trialkyl boron compounds with amines in order to reduce their spontaneous ignition properties; see Japanese Pat. No. 4,529,195.

Although the above procedures shift the ignition temperature into the range of about 0° to 70° C., in actual practice the handling of these mixtures still presents a significant safety problem. Furthermore, the reactivity of these derivatives is greatly reduced.

It is generally known that when free boron alkyl compounds are exposed to oxygen they are rapidly oxidized to boric acid esters, which no longer act as polymerization initiators. Until now, it has therefore been necessary to eliminate any contact with oxygen when measuring out quantities of boron alkyls, and of course also during their manufacturing process, in order to preserve their activity as initiators. In fact, the required quantity of boron alkyl material must be packaged under inert gas into totally airtight storage vessels so that any possibility of oxygen entering the storage vessel is eliminated. The so-portioned boron alkyls must then be used quantitatively. Therefore, this basically interesting group of materials, namely boron alkyl compounds, and systems containing them as described in the prior art, are not suitable for practical use in adhesives.

However, there are significant advantages in the use of boron alkyl initiators; for example, that:
 (a) polymerization reactions using them occur even at low temperatures, including room temperature;
 (b) the starter/hardener system is a single component system; and
 (c) the rate of polymerization can be controlled by varying the amount of oxygen available.

It is also known that certain selected boron alkyl compounds are more stable than others in the presence of atmospheric oxygen. These more stable compounds are usually boron compounds with sterically hindered alkyl radicals. Typical representatives of this class of compounds are diisopinocampheylborane, dicyclohexylborane, thexylborane(2,3-dimethyl-2-butylborane), 3,5-dimethylborinane, diisoamylborane, and particularly 9-borabicyclo[3.3.1]nonane, which is preferred due to practical considerations. Selected compounds of this type generally do not exhibit spontaneous ignition when they come in contact with atmospheric oxygen. On the other hand, under such conditions they quickly lose their ability to initiate polymerization, so that their use in actual technical processes involves significant difficulties. Additionally, these more stable boron alkyls dissolve with great difficulty or at least very slowly in many monomers, particularly in systems containing ester groups.

DETAILED DESCRIPTION OF THE INVENTION

It is the object of this invention to provide polymerization initiators based on organoboron compounds which exhibit all of the above mentioned advantages of such organoboron initiators, and which, particularly when added to monomer systems, initiate easily controllable polymerizations through oxidation with atmospheric oxygen. In contradistinction to presently known systems, the new organoboron systems are relatively inert to oxygen, and never ignite spontaneously. Carried to its ultimate benefits, this invention provides new organoboron systems which are essentially stable when exposed to air, and which therefore even after long periods of exposure to air are capable of initiating spontaneous polymerizations when added to monomers. The new organoboron compound-containing systems also exhibit improved solubility, for example, in monomer systems containing ester groups such as methacrylic acid esters. In this connection, one particular embodiment of this invention relates to fluid initiator substances; however, the scope of this invention is not limited thereto.

The technical solution to the objectives of the invention is based on the surprising finding that the sensitivity of organoboron compounds, particularly of boron alkyl compounds or boron aryl compounds, can be reduced quite considerably by allowing the organoboron compounds to form a homogeneous mixture with organic oligomers or polymers which are inert with respect to the boron compounds. The possible spontaneous ignition of boron compounds that come in contact with air is thereby eliminated. Additionally, the rapid decrease of the reaction initiating activity of these organoboron compounds when exposed to oxygen is significantly moderated so that systems of the type described herein can usually remain exposed to atmospheric oxygen for hours or even days without losing their polymerization initiating properties. Obviously, this significantly simplifies the practical commercial use of these interesting organoboron compounds.

Accordingly, the object of the invention, in its first embodiment, provides starter systems containing an organoboron compound which are activated by exposure to air, for use in the polymerization of olefinic compounds, wherein the starter systems exhibit improved storage stability even when exposed to air. The starter systems of this invention are characterized by the fact that they consist of a homogeneous mixture of at least one organoboron compound which can be activated by air, and at least one organic oligomer or polymer which can range from liquid to solid at room temperature and which is inert in the presence of the organoboron compounds.

The term "homogeneous mixture" used herein is understood to mean mixtures of materials which are single-phase at storage and application temperatures, as is characteristic of true solutions. Accordingly, it is preferred that in the starter systems of the invention the oligomeric or polymeric components which are inert to the organoboron compounds act as solvents therefor. If the organoboron compounds have only limited solubility in the inert carrier system, it is useful to limit the concentrations of the organoboron compounds in the mixtures of the invention to such an extent that the above described homogeneous mixture condition is maintained throughout the entire batch. The starter systems of the invention are therefore basically solutions of organoboron compounds in solvent media having very low vapor pressure. Selected systems of this invention are characterized by the following properties: they are fluid—in particular liquid—and are therefore easy to measure out. They do not ignite spontaneously, and are easy to store. The amount of the starter system required for hardening the monomer components is small. Selected combinations remain fully active even after prolonged exposure to air. The compatibility between the individual monomer system component to be polymerized and the hardening component can be assured readily by proper selection of these components.

Organoboron compounds which act as initiators are the known organoboron compounds which can be activated with oxygen, particularly with atmospheric oxygen, and which can also be produced by known methods. Within the scope of this invention, it is preferred that even the pure organoboron compound will not ignite spontaneously at normal temperatures when exposed to air. This will guarantee increased storage stability while maintaining effectiveness.

Most suitable for use herein are boron alkyl compounds and/or boron aryl compounds or the corresponding organoboron hydride compounds. Boron alkyl compounds or boron alkyl hydrides are a particularly suitable class of materials. Used in the preferred embodiment are compounds of the following types:

$R_1R_2R_3B$, $R_1R_2BH$, and/or $R_1BH_2$;

wherein in these general formulas the radicals $R_1$, $R_2$, and $R_3$ are hydrocarbon radicals, particularly alkyl radicals, which however may optionally contain heteroatoms, preferably O, N and/or S. If at least two such organic radicals are attached to a boron atom, they can form a closed ring system. In a preferred embodiment, the hydrocarbon radical substituents attached to the boron contain not more than about 30 carbon atoms, more preferably not more than about 25 carbon atoms, and most preferably not more than about 12 to 15 carbon atoms.

Organoboron monohydride compounds, especially dialkyl boron monohydrides are particularly useful as the boron-containing initiator component or for the manufacture of other suitable boron containing initiator components. Typical representatives of such boron compounds are for example 9-borabicyclo[3.3.1]nonane (9-BBN), diisopinocampheylborane, dicyclohexylborane, thexylborane(2,3-dimethyl-2-butylborane), 3,5-dimethylborinane, and diisoamylborane. Of these compounds, the first mentioned 9-borabicyclo[3.3.1]nonane (9-BBN) is preferred for practical reasons. The above mentioned compounds can be prepared, for example, from sodium boron hydride and boron trifluoride with suitable olefins or diolefins. Diborane, its ether complex, amine complex, or sulfide complex, can also be used for their manufacture.

A complication of methods for the manufacture of suitable boron compounds can be found in a monograph by Herbert C. Brown, 1975 "Organic Syntheses via Boranes", published by John Wiley & Sons.

Simple trialkyl boranes as well as hydroboration products of monoalkyl boranes or, preferably, dialkyl boranes and olefins can also be used as initiators. Olefins which can be used therein are for example, ethylene, propene, butene, isobutene, hexene, cyclohexene, vinylchloride, allyl chloride, allyl amine, and also (meth)acrylic acid esters, such as the corresponding methyl ester, vinylacetate, or crotonic acid ester. Of the group of suitable organoboron compounds given by way of example, the following warrant particular mention: trialkyl boron compounds with 1 to 12 carbon atoms in the individual alkyl radical, for instance, trimethyl boron, triethyl boron, tripropyl boron, tributyl boron, or trihexyl boron; generally better suited, however, are the more complex boron alkyl compounds, particularly those with sterically hindered alkyl radicals such as diisopinocampheylbutyl boron, thexylcyclohexylcyclopentyl boron, thexyllimonyl boron, trinorbornyl boron, B-butyl-9-borabicyclo[3.3.1]nonane,B-isobutyl-9-borabicyclo[3.3.1]nonane, B-2-(4-cyclohexenyl)-ethyl-9-borabicyclo[3.3.1]nonane, B-cyclopropyl-9-borabicyclo[3.3.1]nonane, B-p-tolyl-9-borabicyclo[3.3.1]nonane, and B-tert-butyl-3,5-dimethylborinane. Particularly suitable are the novel boron alkyl compounds described in U.S. patent application Ser. No. 412,518, filed Aug. 30, 1982, now U.S. Pat. No. 4,515,724, issued May 7, 1985 entitled "Novel Boron Alkyl Compounds and Processes for Their Manufacture and Use", filed of even date herewith, the disclosure of which is incorporated herein by reference. The novel boron alkyl compounds of this copending application contain boron hydride radicals or organoboron radicals attached to fatty acid esters and/or fatty alcohol esters, and which are in particular reaction products of boron hydride and/or organoboron compounds having at least one B-H bond with esters of olefinically unsaturated fatty acids and/or olefinically unsaturated fatty alcohols. Preferred are the corresponding boron containing reaction products of esters of polyvalent alcohols with unsaturated fatty acids and/or polycarboxylic acids with unsaturated fatty alcohols.

Suitable as solvents with very low vapor pressure for use herein are oligomers or polymers which are inert with respect to the organoboron compounds, but which otherwise are not subject to any particular limitations concerning their structure, provided homogeneous miscibility is possible between these polymeric substances which act as solvents and the organoboron compounds. Therefore, all polymers, polycondensates and/or polyaddition products which satisfy the above mentioned conditions are suitable for use herein. The average molecular weights of these oligomeric or polymeric solvents are in the range of from about 200 to about 50,000,000 g/mole. At room temperature, these solvents can range from a low viscosity flowing form to solid form depending on their structure and molecular weight. For certain applications, such as in the area of reaction adhesives, it may be desirable that the organoboron compound-containing mixtures be viscous and capable of flowing, or are spreadable, at room temperature. However, this is not a prerequisite for the effectiveness of the starter systems used as initiators in accordance with this invention. On the contrary, the storage stability of mixtures which are solid at room temperature is particularly good.

Suitable polymeric solvents that can be employed in the practice of the invention are for instance the corresponding polyethers, polyesters, polyamides, polyurethanes, polysiloxanes and the like. Oligomers that are liquid at room temperature with viscosities in the range of approximately 1,000 to 70,000 mPas (room temperature) are of particular interest in the manufacture of systems that are capable of flowing. It has been demonstrated that the polyesters and polyamides in particular have many applications within the scope of this invention. They are manufactured, as are the other polymeric solvents that can be used herein, in accordance with known methods; for instance, by polycondensation of dicarboxylic acids with diols or diamines, wherein monofunctional reactants may be used to limit or regulate their mean molecular weight. Generally preferred are saturated dicarboxylic acids and saturated glycols with up to 15 carbon atoms, preferably up to 10 carbon atoms, in the molecule. The same statements apply to amines or diamines used in the manufacture of polyamides. Suitable polyethers are for example polyethylene oxide or polypropylene oxide with molecular weights in the stated range. The extensive body of technical knowledge in the science of polymer chemistry is applicable to all these particulars.

A further embodiment of the invention relates to the manufacture of the new starter systems which can be activated by exposure to air. For this purpose, the organoboron compounds are dissolved in the inert organic oligomers or polymers in the total absence of oxygen. If desired, this procedure can be carried out at moderately elevated temperatures. For example, it is possible to heat to 100° C., preferably to approximately 70° C., to accelerate dissolution. When using oligomers or polymers which are solids at room temperature, the use of inert, liquid solvents is suggested. Suitable are the known solvents for organoboron compounds, particularly tetrahydrofuran or a polyether, such as diethylene glycol dimethyl ether, as well as esters, halogenated hydrocarbons, and the like. Using these liquid adjuvants, homogeneous mixtures in accordance with this invention are obtained; the liquid adjuvants can then be syphoned off and the boron alkyl/oligomer mixtures isolated. They are appropriately stored in sealed vessels, preferably in the presence of an inert gas, for example nitrogen.

The amount of organoboron compounds in the starter system does not normally exceed about 70 wt. %, and preferably is not more than about 50 wt. %—calculated in relation to the total weight of the mixture. Lower concentrations of organoboron compounds within the stated range are particularly preferred. It is also preferred that the amount of organoboron compound is at least 1 wt. % of the total system, so that amounts of about 1 to about 50 wt. %, preferably about 3 to about 50 wt. % are particularly suitable.

The starter systems of the invention are excellent aerobic polymerization initiators with largely controllable reactivity. A further embodiment of this invention, therefore, relates to the use of the described new systems as polymerization initiators for ethylenically unsaturated systems. The new starters can be used for all known polymerization types. The polymerization can, for instance, be carried out in the system itself, in solution, in emulsion, or in suspension. To initiate polymerization, the starter systems are brought into contact with at least catalytic amounts of an oxygen source. Pure oxygen or air can normally be used as the oxygen source. It is also possible to add oxygen in fixed form, for instance in the form of hydroperoxides or peroxides.

The new starter systems are particularly suitable for use in reaction adhesives. In particular, this invention relates to the use of the new starter systems in 2-component reaction adhesives, which contain in addition to a known adhesive forming component a separately stored hardener. The organoboron compounds in the oligomeric or polymeric inert solvent systems of the present invention act as suitable hardeners. The numerous known compounds with polymerizable ethylenic double bonds which are generally used in reaction adhesives can be used as the polymerizable components. Particularly suitable are the esters of acrylic acid and-/or $\alpha$-substituted acrylic acids such as methacrylic acid, with monohydroxy or polyhydroxy, particularly dihydroxy, alcohols. Also suitable are other known derivatives of (meth)acrylic acid, particularly the corresponding acid amides, which may be substituted at the amide nitrogen. Other possible substituents in the $\alpha$-position of the acrylic acid derivatives are, for example, halogen, particularly chlorine and/or bromine, cyanogen, and alkyl radicals with up to 10 carbon atoms.

One embodiment of this invention relates to the use of the described starter systems as hardeners for adhesives for bonding metal, wood, glass, ceramics, and/or synthetic materials.

To harden such reaction materials, about 0.1 to about 40 wt. %, preferably about 0.1 to about 30 wt. %, and more preferably about 0.5 to about 10 wt. % of boron initiators are generally used, based on the weight of the polymerizing component.

The following examples are given for illustration purposes only and are not meant to limit the invention.

EXAMPLES

Oligomers

The following oligomeric components were used in the examples:

Silicon oil AK 5000 (liquid silicon with a mean molecular weight of about 5000)

Polywax 3000 (polyethylene glycol with a mean molecular weight of about 3000)

Oligoester of trimethyl adipic acid and hexamethylene glycol (mean molecular weight about 1200 g/mole); which was prepared as follows:

Preparation of the above oligoester 4 moles of trimethyladipic acid and 5 moles of hexamethylene glycol were placed into a three-necked flask equipped with a stirrer and distillation bridge. This was heated rapidly to 150° C. in the presence of nitrogen, and the temperature was then raised from 150° C. to 200° C. in the course of the next 6 hours. During this period most of the reaction water separated, which is an indicator of the reaction to the ester condensate. The make-up was then cooled to 150° C., carefully evacuated to 10 Torr; and the reaction was completed at 200° C. and 10 Torr. The product was bottled while still hot. The product was viscous and brown.

Oligoamide from adipic acid and trimethylhexamethylenediamine (mean molecular weight about 1050 g/mole) which was prepared in the following manner:

Preparation of the above oligoamide 1.3 moles of trimethylhexamethylenediamine were placed into a three-necked flask equipped with a stirrer and distillation attachment and 1 mole of adipic acid was added quickly while occasionally cooling with water, wherein care must be taken that the reaction temperature remains between 100° C. and 140° C. in order to keep the ammonium salt liquid. The ammonium salt was heated gradually in the presence of nitrogen for 6 hours from 140° C. to 200° C. During the course of this period of time, most of the reaction water, which is an indicator of the amide formation reaction, separated. The make-up was cooled to about 150° C., and carefully evacuated to 10 Torr, and the amide formation was completed at 200° C. and 10 Torr. The product was bottled while still hot. The product was solid and transparent, with an amine number of 103.

Boron alkyls

The following boron alkyls were used in the examples:
Tri-n-butyl boron
9-borabicyclo[3.3.1]nonane (9-BBN)
Hydroboration product of oleic acid methyl ester and 9-BBN.

Manufacture of 9-borabicyclo[3.3.1]nonane (9-BBN)-Derivative of oleic acid methyl ester:

In order to liberate any residual oxygen, 100 g of oleic acid methyl ester were dissolved in 100 g of freshly distilled tetrahydrofuran. The solvent was then syphoned off in a vacuum at $10^{-4}$ Torr. In a glove box, the oleic acid methyl ester was again dissolved in 100 g of THF which had been freshly distilled in the presence of nitrogen; 41 g of 9-BBN were added to the solution under total exclusion of oxygen, and the mixture was stirred until the 9-BBN had quantitatively gone into solution. Thereafter, it was heated to 60° C. for one hour while stirring. The THF was syphoned off in a vacuum, and the storage vessel was sealed. Samples were removed in the presence of a protecting gas and in total absence of oxygen. The product was homogeneous, of low viscosity, and was yellowish in color.

Mixtures of boron alkyls and oligomers

Manufacture of oligomer/boron alkyl mixtures:

To liberate any residual oxygen, 100 g of the oligomers were dissoled in 100 g of freshly distilled tetrahydrofuran. The solvent was then syphoned off in a vacuum at $10^{-4}$ Torrs. In a glove box, 100 g of freshly distilled, degassed THF were again added for each 100 g of oligomers, and 41 g of the specified boron compounds were added to this solution under total exclusion of oxygen. The mixture was stirred until homogeneous. It was then heated to 60° C. for 1 hour while stirring. The THF was syphoned off in a vacuum and the storage vessel was sealed. Samples were removed in the presence of a protective gas and in total absence of oxygen.

Properties of oligomer/boron alkyl mixtures:

The properties of the oligomer/boron alkyl mixtures are listed in Table 1.

TABLE 1
Properties of Oligomer/Boron Alkyl Mixtures

| Oligomer | Boron Alkyl | | |
|---|---|---|---|
| | Tri-n-butyl boron | 9-BBN | 9-BBNx Oleic acid methyl ester |
| Silicon oil AK 5000 | Cloudy, viscous liquid | Cloudy, viscous liquid | White wax |
| Polywax 3000 | | White powder | |
| Oligoester | Viscous liquid, dark brown | Viscous liquid dark brown | Viscous liquid, dark brown |
| Oligoamide | | Light yellow powder | |

Application of the described oligomer-boron mixtures as hardeners for monomer adhesives General Procedure 40 g of polymethacrylic acid methyl ester (PMMA, commercially available powder)* were dissolved in a beaker in 45 g of methacrylic acid methyl ester (MMA) and 5 g of methacrylic acid (MAS) while stirring. To each 5 g of this mixture, between 1.5 and 23 wt % of a mixture described in Table 1 was added with additional vigorous stirring. The pot life of the mixtures vary between 1 and 15 minutes. These adhesives were used to bond sandblasted and degreased sheet iron within the pot life, and the bonding strength was measured after 24 hours in a stress shearing test in accordance with the German Industrial Standard (DIN 53 281/3). The results are given in Table 2.

*Plexigum MB319 of the Röhm Company, Darmstadt.

In order to prove the stability of the mixtures used in atmospheric oxygen, an additional test series was performed in which they were stored in open vessels in contact with air for 24 to 72 hours, and in which they were then used as hardeners and tested. The pot life and stress shearing strengths for this test series are given in parentheses in Table 2.

TABLE 2

Pot times and stress shearing strengths for sandblasted and degreased test samples made of sheet iron when hardening methacrylate adhesives (40 g PMMA, 45 g MMA, 5 g MAS) with the mixtures of Table 1.
The measurements in parenthesis indicate that the boron alkyl hardener had been stored at room temperature while exposed to air for 24–72 hours prior to application.

| Hardener Concentration Wt % | Pot Life Min. | Stress Shearing Strength $Nmm^{-2}$ |
|---|---|---|
| Mixture of silicon oil AK 5000 and tri-n-butylboron: | | |
| 1.5 | 7 | 0 |
| 3 | 3 | 20 |
| 5 | 2.5 | 20 |
| 10 | 2 | 20 |
| 23 | 1 | 14 |

After being exposed to air for 24 hours, this boron alkyl is no longer active.

| Mixture of silicon oil AK 5000 and 9-BBN. | | |
|---|---|---|
| 1.5 | 14 (10) | 1 (0) |
| 3 | 12 (10) | 8 (0) |
| 5 | 10 (10) | 13 (9) |
| 10 | 5 (10) | 14 (12) |
| 23 | 3 (8) | 8 (9) |

The parenthetical test results are for the above boron hardener which had been exposed to air for 72 hours prior to application.

| Mixture of silicon oil AK 5000 and the product of oleic acid methyl ester/9-BBN. | | |
|---|---|---|
| 1.5 | 9.5 | 13 |
| 3 | 6.5 | 18 |
| 5 | 5.5 | 23 |

TABLE 2-continued

Pot times and stress shearing strengths for sandblasted and degreased test samples made of sheet iron when hardening methacrylate adhesives (40 g PMMA, 45 g MMA, 5 g MAS) with the mixtures of Table 1.
The measurements in parenthesis indicate that the boron alkyl hardener had been stored at room temperature while exposed to air for 24–72 hours prior to application.

| Hardener Concentration Wt % | Pot Life Min. | Stress Shearing Strength Nmm$^{-2}$ |
|---|---|---|
| 10 | 3 | 26 |
| 23 | 1.5 | 17 |

After being exposed to air for 72 hours, this boron alkyl was no longer active.

Mixture of Polywax 3000 and 9-BBN.

| | | |
|---|---|---|
| 1.5 | 15 (10) | 0 (0) |
| 3 | 14 (10) | 8 (0) |
| 5 | 11 (10) | 8 (3.6) |
| 10 | 9 (10) | 6 (9) |
| 23 | 3 (10) | 4 (5) |

The above parenthetical test results are for the above boron alkyl hardener which had been exposed to air at room temperature for 72 hours prior to application.

Mixture of oligoester and tri-n-butylboron.

| | | |
|---|---|---|
| 1.5 | 7.5 (14) | 6 (0) |
| 3 | 5 (14) | 11 (0) |
| 5 | 4 (14) | 16 (0) |
| 10 | 4 (9) | 16 (5) |
| 23 | 4 (8) | 19 (11) |

The parenthetical test results are for the above boron alkyl hardener which had been exposed to air at room temperature for 24 hours prior to application.

Mixture of oligoester and 9-BBN.

| | | |
|---|---|---|
| 1.5 | 9 (15) | 17 (0) |
| 3 | 9 (9) | 26 (14) |
| 5 | 7 (7) | 21 (21) |
| 10 | 6.5 (6) | 26 (26) |
| 23 | 6 (5.5) | 24 (24) |

The parenthetical test results are for the above boron alkyl hardener which had been exposed to air for 24 hours prior to application.

Mixture of oligoester and the product of oleic acid methyl ester/9-BBN.

| | | |
|---|---|---|
| 1.5 | 14 (15) | 0 (0) |
| 3 | 9 (15) | 7 (0) |
| 5 | 8 (15) | 24 (19) |
| 10 | 6 (12) | 28 (24) |
| 23 | 5 (8) | 28 (27) |

The parenthetical test results are for the above boron alkyl hardener which had been exposed to air for 24 hours at room temperature prior to application.

Mixture of oligoamide and 9-BBN.

| | | |
|---|---|---|
| 1.5 | 7 (10) | 0 (7) |
| 3 | 6.5 (7) | 6 (15) |
| 5 | 4 (6.5) | 8 (15) |
| 10 | 3.5 (5) | 13 (8) |
| 23 | 2 (3) | 11 (2) |

The parenthetical test results are for the above boron alkyl hardener which had been exposed to air for 72 hours at room temperature prior to application.

What is claimed is:

1. A two-component reactive adhesive comprising
(A) a first adhesive-forming component comprising monomers containing ethylenic double bonds polymerizable to form an adhesive; and
(B) a second hardener component maintained separately from said first component comprising a stabilized organoboron initiator system for initiating the free radical polymerization of said monomers consisting essentially of a homogeneous mixture of:
(a) at least one organoboron compound activatable upon exposure to air to initiate said polymerization comprising an air-sensitive boron alkyl or boron aryl compound in an amount not over about 70% by weight of the initiator system; and
(b) at least one organic oligomer or polymer having an average molecular weight of from about 200 to about 50,000 g/mol which is inert to said organoboron compound and in which the organoboron compound is substantially completely dissolved;

characterized in that the organoboron initiator system is essentially stable under prolonged exposure to air without substantial loss of initiator function.

2. A two component reactive adhesive in accordance with claim 1 wherein said initiator system (B) is present in from about 0.1 to about 40 wt. %, based on the weight of polymerizable monomers in said first component (A).

3. A two component reactive adhesive in accordance with claim 1 wherein said initiator system (B) is present in from about 0.5 to about 10 wt. %, based on the weight of polymerizable monomers in said first component (A).

4. A two component reactive adhesive in accordance with claim 1, 2, or 3 wherein the organoboron compound (a) is present in from about 1 to about 70% by weight, based on the total weight of the initiator system (B).

5. A two component reactive adhesive in accordance with claim 4 wherein the organoboron compound (a) is present in from about 1 to about 50% by weight, based on the total weight of the initiator system (B).

6. A two component reactive adhesive in accordance with claim 1, 2, or 3 wherein said organoboron compound (a) contains at least one radical selected from the group consisting of an alkyl radical and an aryl radical, and from 0 to 2 B-H bonds.

7. A two component reactive adhesive in accordance with claim 6 wherein said organoboron compound (a) contains at least one alkyl group attached to the boron atom.

8. A two component reactive adhesive in accordance with claim 7 wherein said organoboron compound (a) is selected from the group consisting of a dialkylboron hydride, a trialkylboron compound, and a cycloalkylboron hydride wherein the cycloalkyl group forms a ring structure with the boron atom.

9. A two component reactive adhesive in accordance with claim 8 wherein the alkyl or cycloalkyl groups in said organoboron compound (a) each contain not more than 30 carbon atoms and which contain no heteroatoms or one or more of the heteroatoms O, N or S.

10. A two component reactive adhesive in accordance with claim 9 wherein the alkyl or cycloalkyl groups in said organoboron compound (a) each contain not more than 15 carbon atoms.

11. A two component reactive adhesive in accordance with claim 1, 2, or 3 wherein the oligomer or polymer component (B) (b) is in the form of a liquid or a paste at room temperature.

12. A method of bonding metal, wood, glass, ceramics or synthetic materials to a material of like or different composition comprising applying thereto a mixture of the two components of the two component reactive adhesive of claim 1, 2, or 3.

13. A two component reactive adhesive in accordance with claim 5 wherein the organoboron compound (a) is present in from about 3 to about 50% by weight, based on the total weight of the initiator system (B).

14. A two component reactive adhesive in accordance with claim 1 wherein the initiator system (B) also contains an organic solvent which is inert to said organoboron compound.

15. A two component reactive adhesive in accordance with claim 1 wherein the oligomer or polymer component (B) (b) is an oligomer which is liquid at room temperature and which has a viscosity at room temperature of from about 1,000 to about 70,000 mPas.

16. A two component reactive adhesive in accordance with claim 1 wherein the oligomer or polymer component (B) (b) is at least one oligomer selected from the group consisting of oligoesters, oligoamides, and oligoethers.

17. A two component reactive adhesive in accordance with claim 1, wherein the oligomer or polymer component (B) (b) is a polyether, polyester, polyamide, polyurethane, polysiloxane, oligoester, oligoamide, or oligoether.

18. A two component reactive adhesive in accordance with claim 1, wherein the organoboron compound (a) is not self-igniting in the pure form.

* * * * *